United States Patent [19]
Sakairi et al.

[11] Patent Number: 5,949,041
[45] Date of Patent: Sep. 7, 1999

[54] AUTOMATIC TRANSMISSION CONTROL SWITCH AND HARNESS ASSEMBLY AND METHOD OF MANUFACTURE

[75] Inventors: Minoru Sakairi, Chiba; Shigeru Ishii; Hiroyuki Yada, both of Kanagawa, all of Japan

[73] Assignees: Nissan Motor Co., Ltd., Yokohama; Niles Parts Co., Ltd., Tokyo, both of Japan

[21] Appl. No.: 08/874,859

[22] Filed: Jun. 13, 1997

[30] Foreign Application Priority Data

Jun. 13, 1996 [JP] Japan .................................. 8-152404

[51] Int. Cl.$^6$ .............................. H01H 9/06; H01H 3/16; H01H 21/12; H01H 21/36
[52] U.S. Cl. ........................ 200/61.88; 29/622; 200/11 J; 200/61.91
[58] Field of Search ............................. 200/11 R–11 TW, 200/61.85–61.91, 292; 29/622

[56] References Cited

U.S. PATENT DOCUMENTS

| | | | |
|---|---|---|---|
| 2,946,877 | 7/1960 | Nalette et al. .......................... | 200/292 |
| 3,602,656 | 8/1971 | Graddy et al. ...................... | 200/11 J X |
| 4,239,947 | 12/1980 | Breitung et al. ...................... | 200/61.89 |
| 4,897,513 | 1/1990 | Oka et al. ........................... | 200/11 J X |
| 5,099,092 | 3/1992 | Lauritsen ............................... | 200/61.91 |

FOREIGN PATENT DOCUMENTS 2-99531 8/1990 Japan .

*Primary Examiner*—J. R. Scott
*Attorney, Agent, or Firm*—Foley & Lardner

[57] ABSTRACT

An automatic-transmission control for outputting a switch signal of a shift position is produced as follows. A first terminal unit includes small-power fixed contacts coupled with small-power contacts of a connector through a coupling portion, is formed. A second terminal unit, which includes large-power fixed contacts coupled with large-power contacts of a connector through a coupling portion, is formed. A positioning resin block is formed to at least one of the first and second terminal units. The first and second terminal units are laminated through the positioning block. A switch body and a connector are molded upon inserting the laminated first and second terminal units in a molding die. The switch body and the connector are separated by cutting the coupling portion.

11 Claims, 9 Drawing Sheets

AUTOMATIC TRANSMISSION CONTROL SWITCH AND HARNESS ASSEMBLY AND METHOD OF MANUFACTURE

BACKGROUND OF THE INVENTION

1. Field of the Invention

The present invention relates to an automatic-transmission control switch which outputs switching signal according to a shift position of a shift lever and to a method of producing the same.

2. Description of the Prior Art

Japanese Utility Model Provisional Publication No. 2-99531 discloses an automatic-transmission control switch which is constituted by a sector-shaped body, a rotation shaft, and a movable member. The body includes plural pairs of fixed contacts for executing a switch setting according to the shift position of an automatic transmission. The rotation shaft is installed in the body so as to be rotatable in the body by an external operation thereof. The movable member is integrally formed with the rotation shaft and is swingable on the rotation shaft so that movable contacts installed on the movable member are switchingly moved on the fixed contacts in the body. Terminal plates connected to the respective fixed contacts are connected to lead wires respectively by means of caulking. Further, the lead wires are connected with a large-power connector unit and a small-power connector unit by means of caulking.

However, this conventional control switch requires connecting the separated body with the large-power connector unit and the small-power connector unit through lead wires by means of caulking. This structure increases a production cost thereof and time for assembling it.

SUMMARY OF THE INVENTION

It is an object of the present invention to provide an improved automatic-transmission control switch and a method of producing the same which facilitates a forming process of a switch body, a connecting process between the switch body and a harness, and a connecting process between the harness and a connector. Further, by the application of this method, it becomes possible to simultaneously mold the switch body and the connector so as to decrease the producing cost thereof.

An aspect of the present invention resides in an automatic-transmission control switch which comprises a switch body, a harness and a connector. The automatic-transmission control switch functions to output a switch signal for setting a shift position of an automatic transmission in relation to a position of a shift lever. The switch body includes a plurality of small-power fixed contacts which are respectively disposed at positions corresponding to shift positions taken by the shift lever; a plurality of large-power fixed contacts which are respectively disposed at positions corresponding to shift positions taken by the shift lever; a movable contact which selectively establishes a connection in the small-power fixed contacts and said large-power fixed contacts according to the shift position; a plurality of small-power external connecting terminals which are integrally formed with said small-power fixed contacts; and a plurality of large-power external connecting terminals which are integrally formed with said large-power fixed contacts. The harness is connected with the small-power external connecting terminals and the large-power external connecting terminals by means of ultrasonic welding. The connector includes a plurality of small-power connecting terminals connected with the harness by means of ultrasonic welding; a plurality of large-power connecting terminals connected with said harness by means of ultrasonic welding; and a plurality of contacts integrally formed with the small-power terminals and the large-power terminals, respectively.

Another aspect of the present invention resides in a method of producing an automatic-transmission control switch which outputs a switch signal for setting a shift position of an automatic transmission in relation to a shift lever. The method comprises the steps set forth below: A first terminal unit, which includes a plurality of small-power fixed contacts coupled with a plurality of small-power contacts of a connector through a coupling portion. A second terminal unit, which includes a plurality of large-power fixed contacts coupled with a plurality of large-power contacts of a connector through a coupling portion, is formed. A positioning resin block is formed to at least one of the first and second terminal units. The first and second terminal units are laminated through the positioning resin block. A switch body and a connector are molded upon inserting the laminated first and second terminal units in a molding die. The switch body and the connector are separated by cutting the coupling portion.

DETAILED DESCRIPTION OF THE INVENTION

Figure 10A:
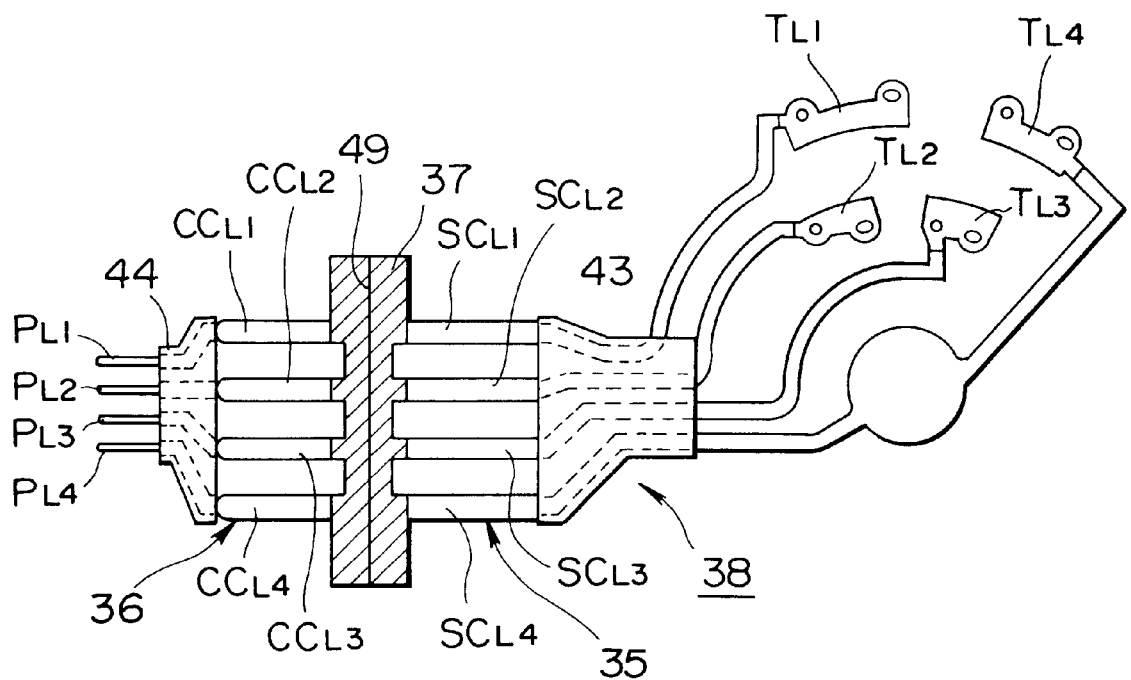
FIG. 10A is a front view of a second terminal unit used in the control switch of FIG. 1.
Figure 10B:
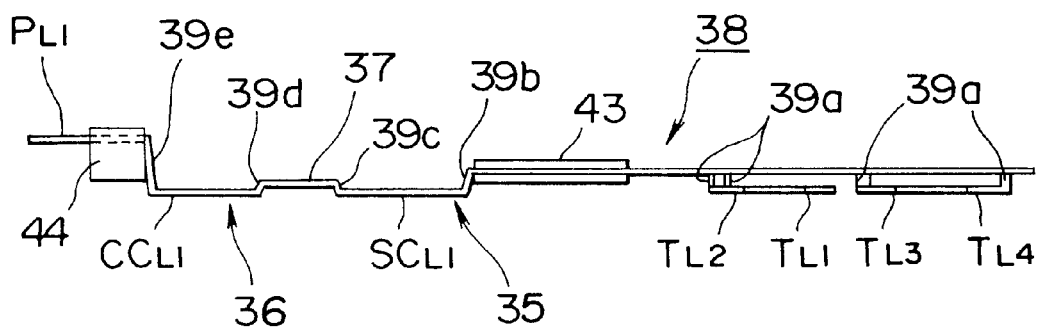
FIG. 10B is a plan view of FIG. 10A.
Figure 11:
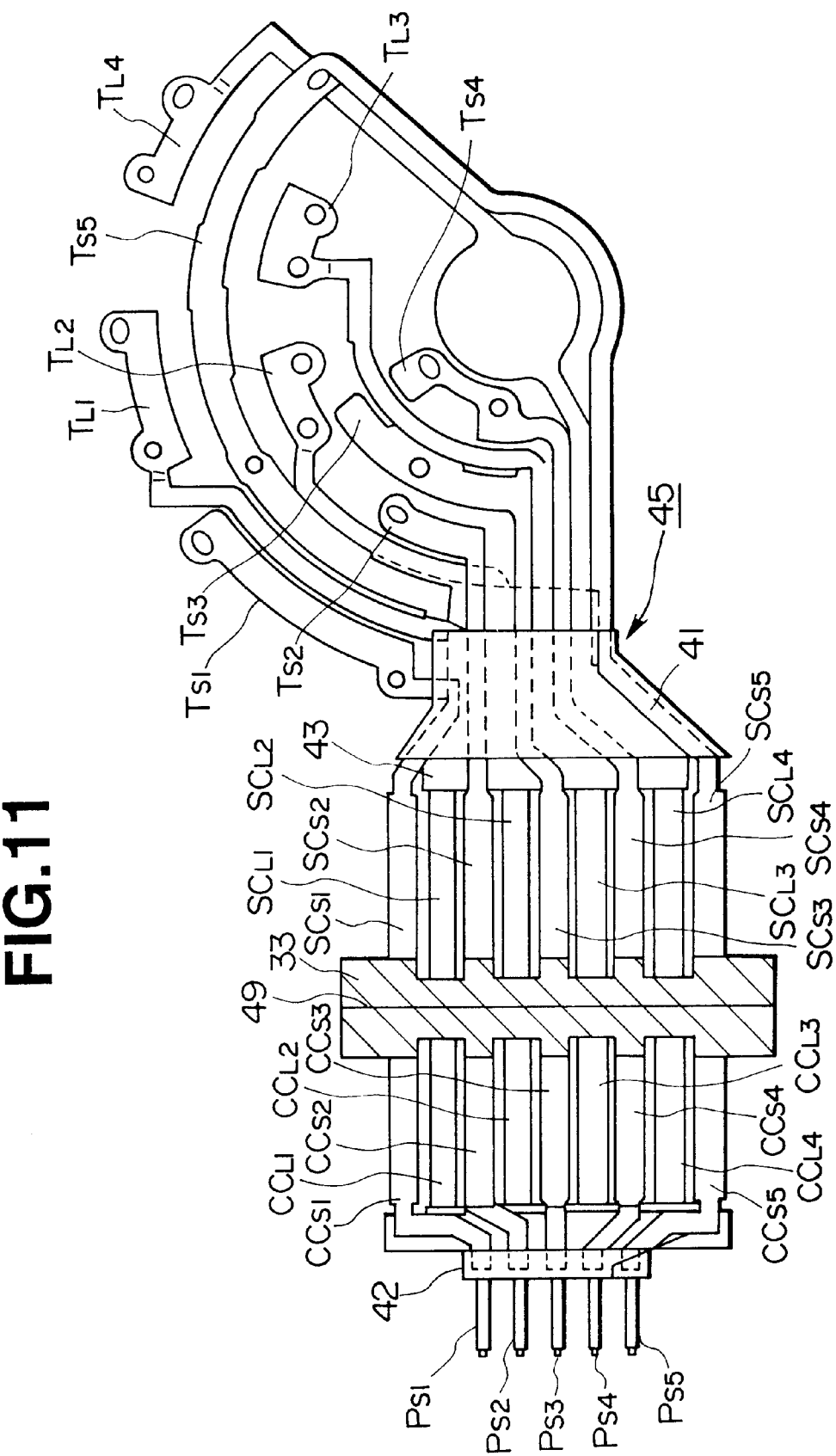
FIG. 11 is a front view which shows the laminated first and second terminal units.
Figure 12:
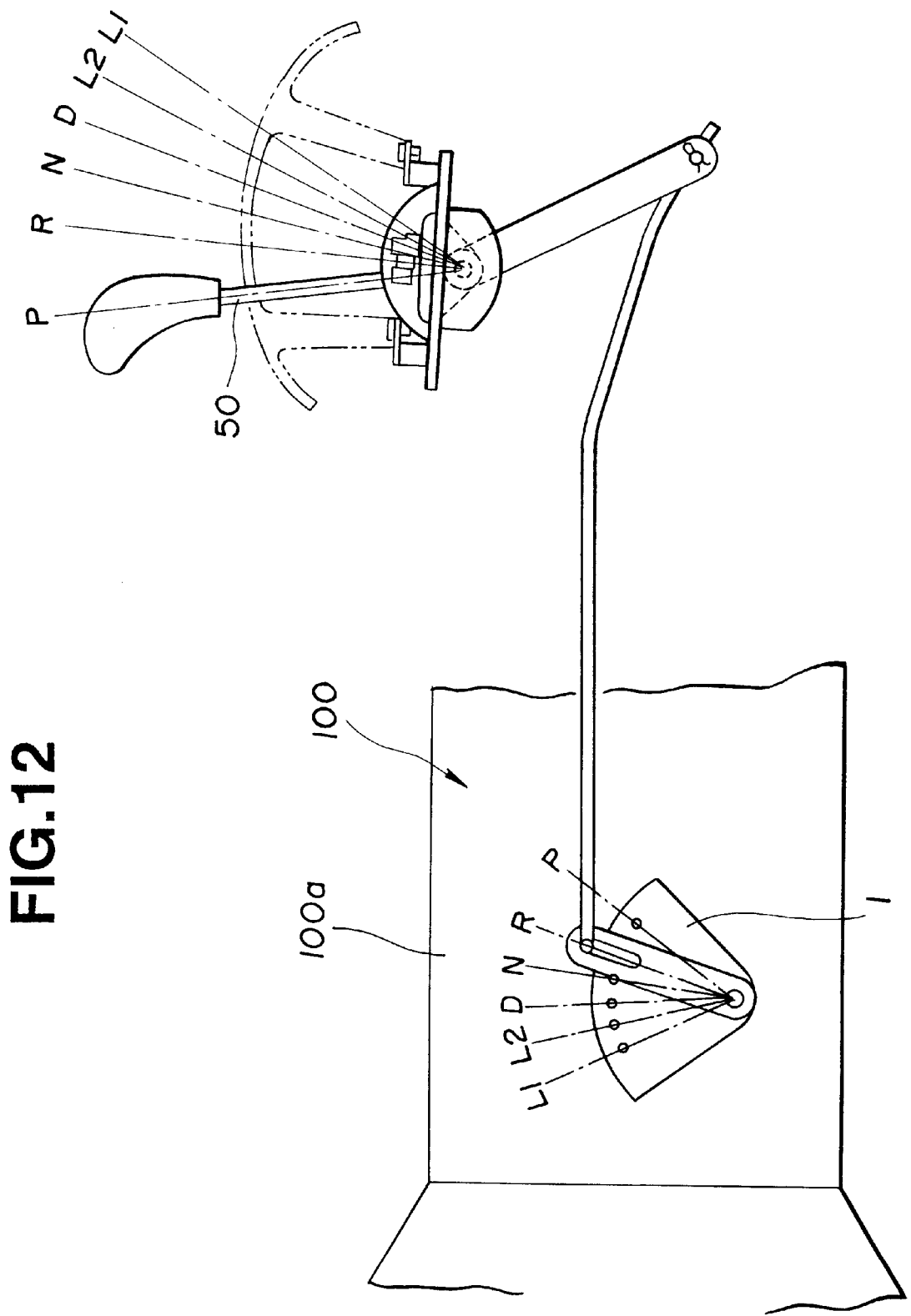
FIG. 12 is a schematic view which shows an installed condition of the control switch to an automatic transmission.

Referring to FIGS. 1 to 12, there is shown an embodiment of an automatic-transmission control witch (inhibitor switch) 1 according to the present invention. The automatic-transmission control switch 1 is directly installed in a transmission case 100a of an automatic transmission 100, as shown in FIG. 12.

Figure 1:
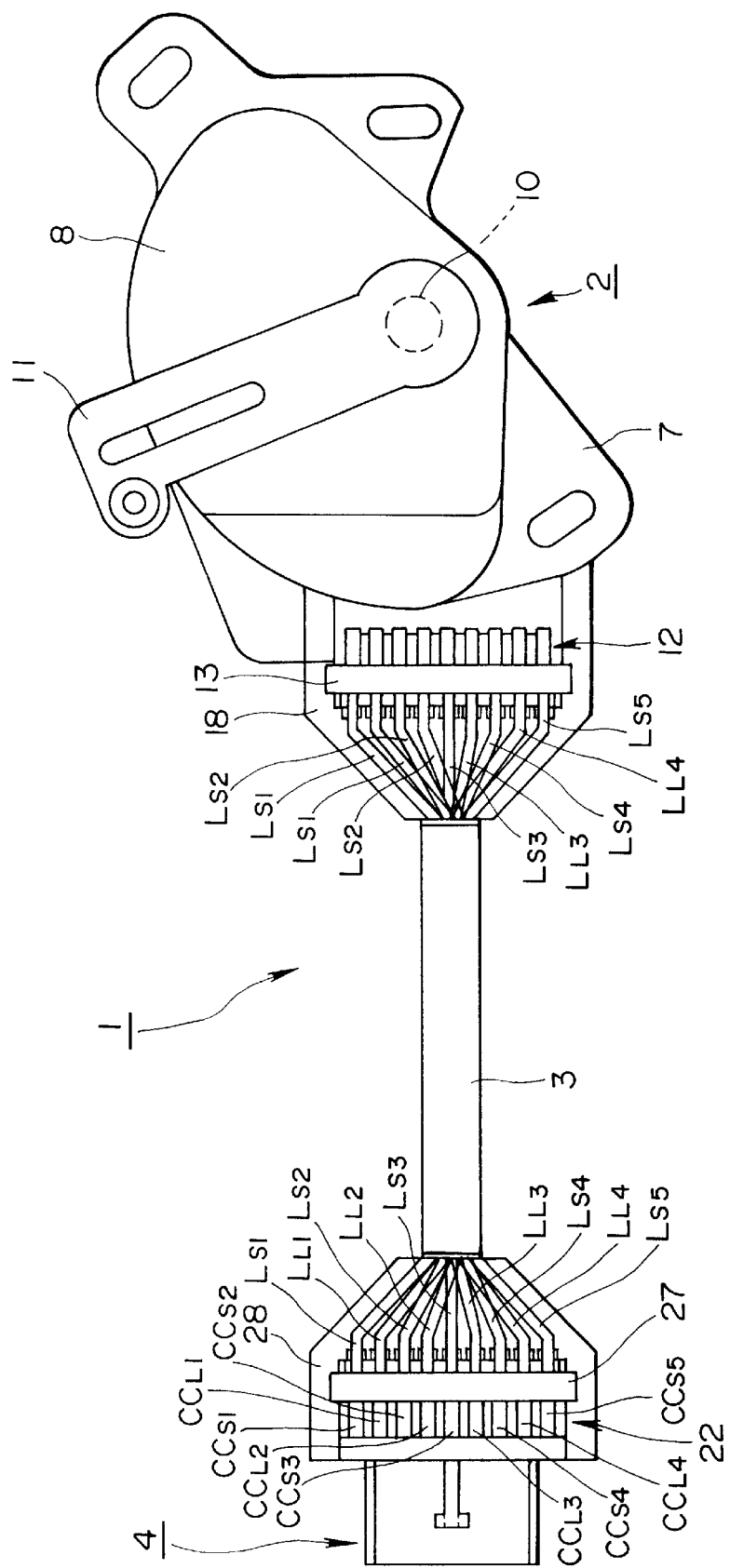
FIG. 1 is a front view which shows an embodiment of an automatic-transmission control switch according to the present invention.

As shown in FIG. 1, the automatic-transmission control switch 1 comprises a switch body 2, a connector 4 and a harness 3 through which the switch body 2 is connected with the connector 4. The switch body 2 is provided with a sector-shaped case body 7 which has a recess portion 6, a cover 8 which covers the recess portion 6 of the case body 7, a movable member 9 which is rotatably disposed in the recess portion 6, and a rotation lever 11 which is connected with a rotation shaft 10 of the movable member 9. The rotation shaft 10 is projected from the cover 8. The rotation lever 11 is swung in connection with the swinging movement of the shift lever 50.

Five small-power fixed contacts $T_{S1}$ to $T_{S5}$ and four large-power fixed-contacts $T_{L1}$ to $T_{L4}$ are formed into a pattern corresponding to the shift positions such as P-range, R-range, N-range, D-range, L2-range and L1-range of the shift lever 50. The small-power fixed contacts $T_{S1}$ to $T_{S5}$ and the large-power fixed contacts $T_{L1}$ to $T_{L4}$ are disposed on a bottom surface of the recess portion 6 of the case body 7 so as to be electrically insulated with each other and to be slightly projected from the bottom surface of the recess portion 6 of the case body 7. The large-power fixed contacts $T_{L1}$ to $T_{L4}$ constitute a part of a starter current circuit for an engine when the shift lever 50 is set at P-range or N-range. The small-power fixed contacts $T_{S1}$ to $T_{S5}$ are integrally and continuously connected with small-power external connecting terminals $SC_{S1}$ to $SC_{S5}$, respectively, and four large-power fixed contacts $T_{L1}$ to $T_{L4}$ are integrally and continuously connected with large-power external connecting terminals $SC_{L1}$ to $SC_{L4}$.

Figure 2:
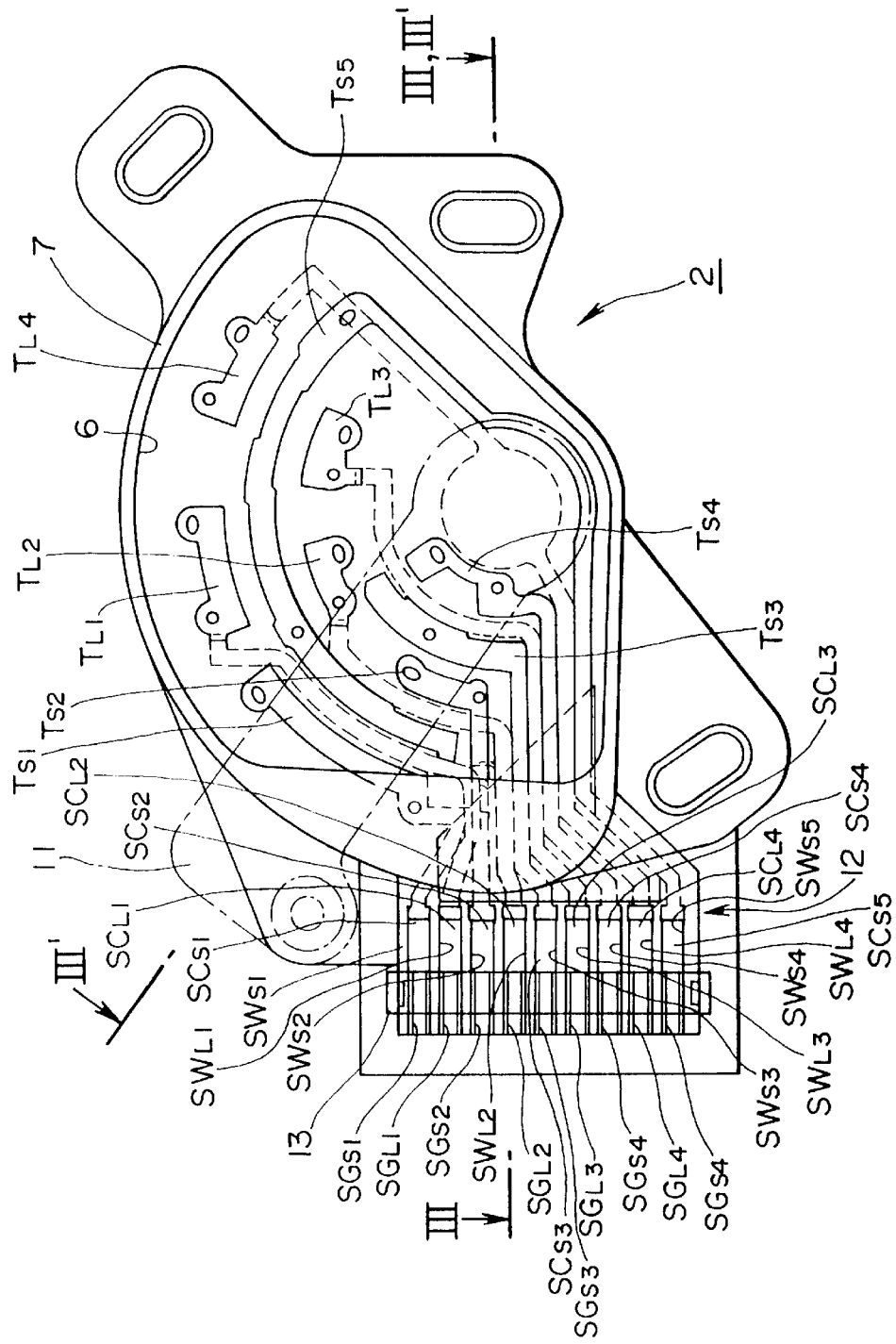
FIG. 2 is a front view of the control switch from which a cover, a rotatable member and a rotatable lever are detached.

Connecting end of each fixed contact $T_{S1}$ to $T_{S5}$, $T_{L1}$ to $T_{L4}$ is embedded in the case body 7 and is extended through each of the external connecting terminals $SC_{S1}$ to $SC_{S5}$, $SC_{L1}$ to $SC_{L4}$ toward a harness connecting portion 12 which is formed at a left end side of the case body 7, as shown in FIGS. 1 and 2.

Each of small-power fixed contacts $T_{S1}$ to $T_{S5}$ is formed into a plane plate shape, that is, a contact portion point projecting from the bottom surface of the recess portion 6 is continuously flat toward the harness connecting portion 12, and they are located on the same plane. Each of large-power fixed contacts $T_{L1}$ to $T_{L4}$ is formed such that a contact portion and a connecting portion thereof are formed at a plane as same as the plane of the small-power fixed contacts $T_{S1}$ to $T_{S5}$ and the other portion thereof such as an intermediate portion is depressed in order to establish electrical insulation from the intermediate portions of the small-power fixed contacts $T_{S1}$ to $T_{S5}$.

Figure 3:
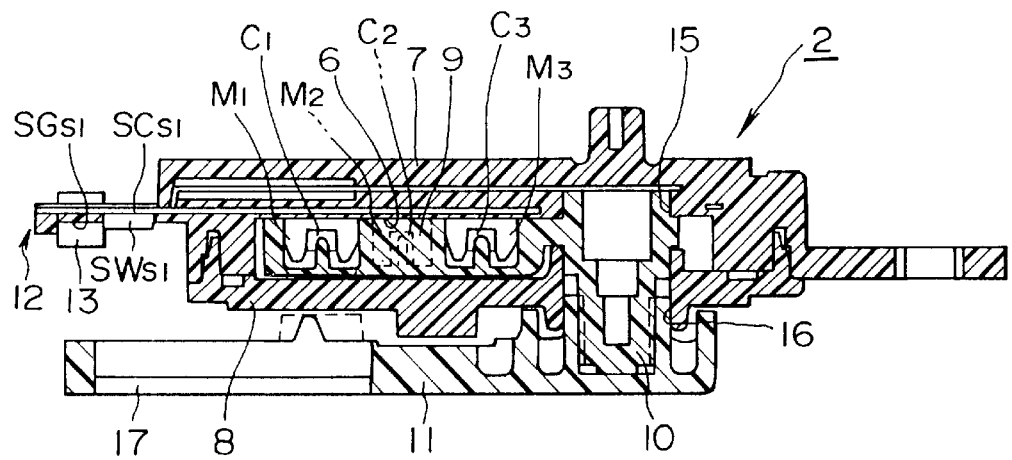
FIG. 3 is a cross-sectional view taken along III'–III line of FIG. 2, but partially taken along III'–III line of FIG. 2.
Figure 4:
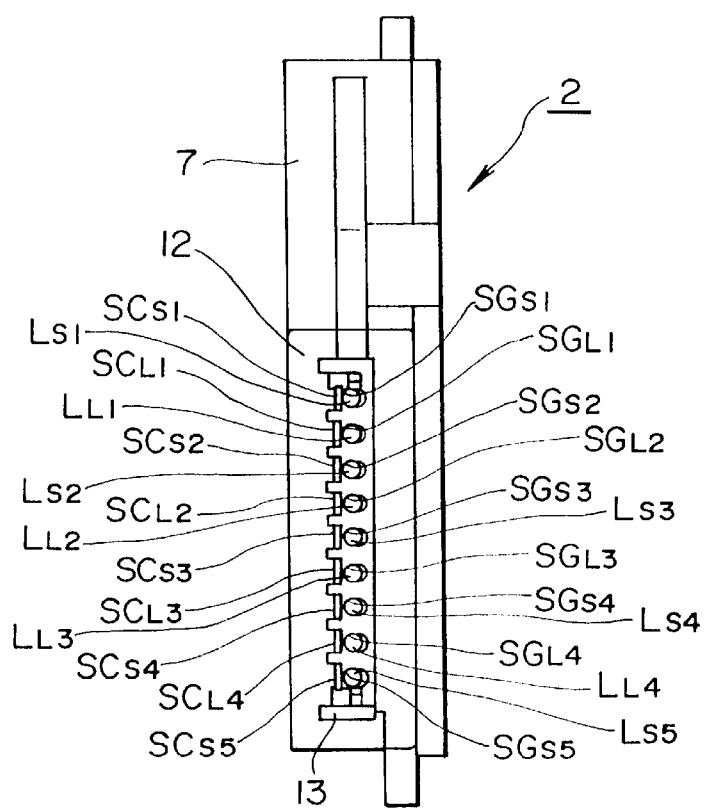
FIG. 4 is a side view of FIG. 2.

As shown in FIGS. 2 to 4, the small-power external connecting terminals $SC_{S1}$ to $SC_{S5}$ and the larger-power external connecting terminals $SC_{L1}$ to $SC_{L4}$ are alternatively arranged so as to be vertically parallel at predetermined intervals in the vicinity of the harness connecting portion 12. The left end portions of the external connecting terminals $SC_{S1}$ to $SC_{S5}$ and $SC_{L1}$ to $SC_{L4}$ are slightly projected from the case body 7 toward the left hand side. Lead-wire guide grooves $SG_{S1}$ to $SG_{S5}$ and $SG_{L1}$ to $SG_{L4}$ for guiding lead wires $L_{S1}$ to $L_{S5}$ and $L_{L1}$ to $L_{L4}$ are formed at a front side of the case body 8 so as to correspond to the position of the fixed contacts $T_{S1}$ to $T_{S5}$ and $T_{L1}$ to $T_{L4}$. The harness 3 is formed into a semicircle in cross section by the lead wires $L_{S1}$ to $T_{S5}$ and $L_{L1}$ to $L_{L4}$. Welding windows $SW_{S1}$ to $SW_{S5}$ and $SW_{L1}$ to $SW_{L4}$ for exposing the fixed contacts $T_{S1}$ to $T_{S5}$ and $T_{L1}$ to $T_{L4}$ are formed at the right end side of the lead-wire guiding grooves $SG_{S1}$ to $SG_{S5}$ and $SG_{L1}$ to $SG_{L1}$.

As shown in FIGS. 1 and 2, the lead wires $L_{S1}$ to $L_{S1}$ and $L_{L1}$ to $L_{L4}$ whose tip ends are bared from covers are inserted into the case body 7 so that the bared core wires thereof are in contact with the fixed contacts $T_{S1}$ to $T_{S5}$ and $T_{L1}$ to $T_{L4}$ at the welding windows $SW_{S1}$ to $SW_{S5}$ and $SW_{L1}$ to $SW_{L4}$, respectively. By covering the surface side of the fixed contacts $T_{S1}$ to $T_{S5}$ and $T_{L1}$ to $T_{L4}$ with the cover 13, the core wires of the lead wires $L_{S1}$ to $L_{S1}$ and $L_{L1}$ to $L_{L4}$ and the fixed contacts $T_{S1}$ to $T_{S5}$ and $T_{L1}$ to $T_{L4}$ are tacked, and they are then welded by means of ultrasonic welding.

An engaging recess portion 15 for rotatably supporting the hollow rotation shaft 10 of the movable member 9 is formed at the recess portion 6 of the case body 7. An engaging hole 16 is formed at a position of the cover 8 corresponding to the engaging recess portion 15. The hollow rotation shaft 10 is engaged with the engaging recess portion 15 of the case body 7 and the engaging hole 16 of the cover 8 such that movable member 9 is rotatable in the recess portion 6. The movable member 9 has three movable contacts $M_1$ to $M_3$ which are electrically connected with the fixed contacts $T_{S1}$ to $T_{S5}$ and $T_{L1}$ to $T_{L4}$. The three movable contacts $M_1$ to $M_3$ are disposed at an opposite surface to the fixed contacts $T_{S1}$ to $T_{S5}$ and $T_{L1}$ to $T_{L4}$. The movable contacts $M_1$ to $M_3$ are made of upside-down U-shaped electric conductors and are pushed by coil springs $C_1$ to $C_3$, respectively toward the fixed contacts $T_{S1}$ to $T_{S5}$ and $T_{L1}$ to $T_{L4}$.

The rotation lever 11 is engaged with the rotation shaft 10 projecting from the cover 8 of the movable member 9, and a connecting slot 17 connected with the shift lever 50 is formed at a tip end portion of the rotation lever 11. The harness connecting portion 12 is covered with a transparent sealing member 18 of a synthetic resin such as adhesive when connected with the harness 3. On the other hand, the connector 4 has a case body 21 made of synthetic resin as shown in FIGS. 5 to 8. A harness connecting portion 22 for connecting the harness 3 with the case body 21 is formed at the right end surface of the case body 21.

Figure 5:
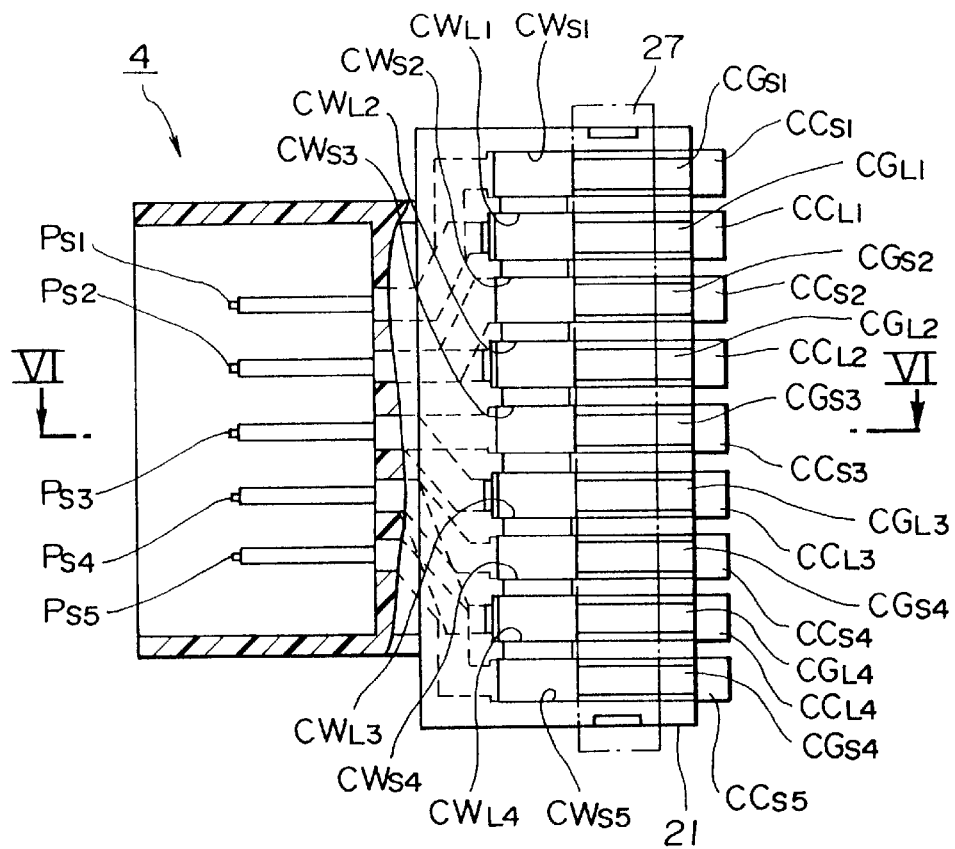
FIG. 5 is a front view which shows a connector of the control switch of FIG. 1.

The harness connecting portion 22 comprises five small-power connecting terminals $CC_{S1}$ to $CC_{S5}$ and four large-power connecting terminals $CC_{L1}$ to $CC_{L4}$ which are alternatively arranged in vertically parallel at predetermined intervals as similar to those of the harness connecting portion 12 of the switch body 2. Each of the connecting terminals $CC_{S1}$ to $CC_{S5}$ and $CC_{L1}$ to $CC_{L4}$ is formed into a rectangular sheet shape. As shown in FIG. 5, the connecting terminals $CC_{S1}$ to $CC_{S5}$ and $CC_{L1}$ to $CC_{L4}$ are slightly projected from the case body 21 toward the right ward direction. The lead-wire guide grooves $CG_{S1}$ to $CG_{S5}$ and $CG_{L1}$ to $CG_{L1}$ for guiding the lead wires $L_{S1}$ to $L_{S5}$ and $L_{L1}$ to $L_{L4}$ constituting the semicircular cross section harness 3 are formed at a front surface side of the case body 21 corresponding to the connecting terminals $CC_{S1}$ to $CC_{S5}$ and $CC_{L1}$ to $CC_{L4}$. Welding windows $CW_{S1}$ to $CW_{S5}$ and $CW_{L1}$ to $CW_{L4}$ for exposing the connecting terminals $CC_{S1}$ to $CC_{S5}$ and $CC_{L1}$ to $CC_{L4}$ are formed at the left end side of the lead-wire guide grooves $CG_{S1}$ to $CG_{S5}$ and $CG_{L1}$ to $CG_{L4}$, as shown in FIG. 5.

Figure 6:
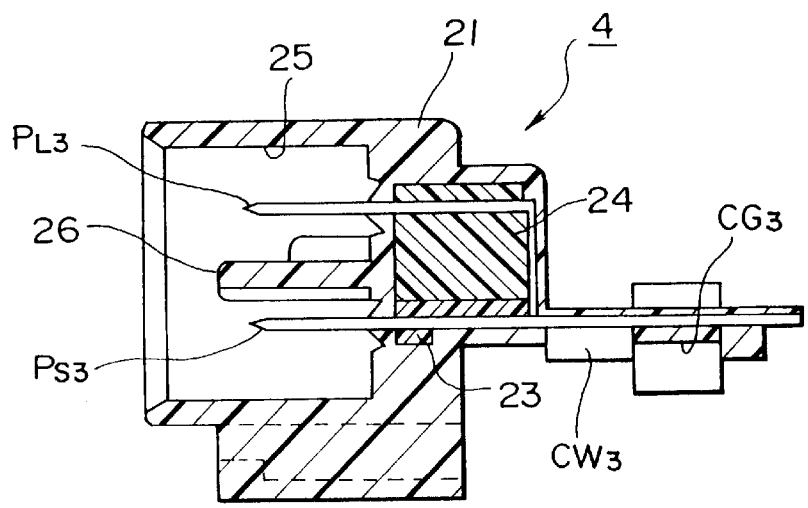
FIG. 6 is a cross-sectional view taken along line VI—VI of FIG. 5.
Figure 7:
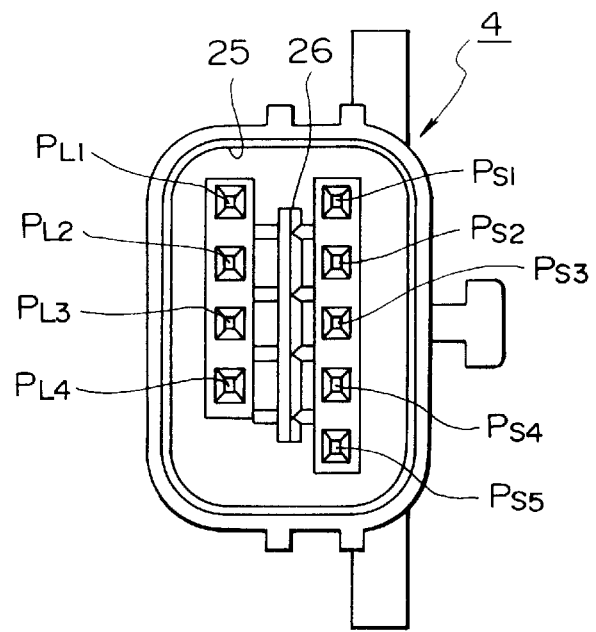
FIG. 7 is a side view of FIG. 5.
Figure 8:
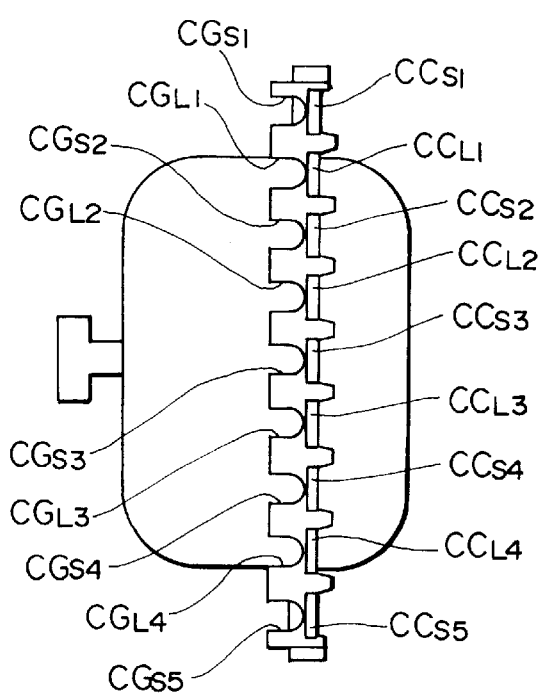
FIG. 8 is another side view of FIG. 5.

The other end portions of the small-power connecting terminals $CC_{S1}$ to $CC_{S5}$ are embedded in the case body 21 while being gathered to a central portion on the same plane and being covered with a resin block 23. Then, the end portions of the small-power connecting terminals $CC_{S1}$ to $CC_{S5}$ are extended toward the left end portion, as shown in FIG. 5. The other end portions of the large-power connecting terminals $CC_{L1}$ to $CC_{L4}$ are bent into a crank shape as shown in FIG. 6. Then, the end portions of the large-power connecting terminals $CC_{L1}$ to $CC_{L4}$ are embedded in the case body 21 while being gathered to a central portion on the same plane and being covered with a resin block 24. Then, the end portions are extended toward the lift end portion, as shown in FIG. 5.

As shown in FIG. 6, a contact-storing recess portion 25 is formed at a left end of the case body 21. An insulating lib 26, which is vertically extended, is formed at a central portion of the contact-storing recess portion 25. As shown in FIG. 5, five small-power contacts $P_{S1}$ to $P_{S5}$ integral with the small-power connecting terminals $CC_{S1}$ to $CC_{S5}$ are set at the front side, and four large-power contacts $P_{L1}$ to $P_{L4}$ integral with the large-power connecting terminals $C_{L1}$ to $C_{L4}$ are set at the rear side. The small-power contacts $P_{S1}$ to $P_{S5}$ are faced with the large-power contacts $P_{L1}$ to $P_{L4}$ while disposing the insulating lib 26 therebetween. Each of the contacts $P_{S1}$ to $P_{S5}$ and $P_{L1}$ to $P_{L4}$ is formed into a rectangular pin shape.

As shown in FIG. 1, the lead wires $L_{S1}$ to $L_{S5}$ and $L_{L1}$ to $L_{L4}$ whose tip ends are bared from covers are inserted into the lead-wire guide grooves $CG_{S1}$ to $CG_{S5}$ and $CG_{L1}$ to $CG_{L4}$ in the harness connecting portion 22 so that the bared core wires thereof are in contact with the connecting terminals $CC_{S1}$ to $CC_{S5}$ and $CC_{L1}$ to $CC_{L4}$ at the welding windows $CW_{S1}$ to $CW_{S5}$ and $CW_{L1}$ to $CW_{L4}$. By covering the surface side of the connecting terminals $CC_{S1}$ to $CC_{S5}$ and $CC_{L1}$ to $CC_{L4}$ with the cover 27 of a U-shape, the core wires of the lead wires $L_{S1}$ to $L_{S5}$ and $L_{L1}$ to $L_{L4}$ and the connecting terminals $CC_{S1}$ to $CC_{S5}$ and $CC_{L1}$ to $CC_{L4}$ are tacked, and they are then welded by means of ultrasonic welding.

The harness connecting portion 22 is connected to the harness 3 and covered with a resin-made sealing member 28 such as adhesive.

Therefore, the automatic-transmission control switch 1 having the connector 4 is constructed by executing the following processes: (1) inserting the lead wires $L_{S1}$ to $L_{S5}$ and $L_{L1}$ to $L_{L4}$ whose tip ends are bared from covers into the lead-wire guide grooves $SG_{S1}$ to $SG_{S5}$ and $SG_{L1}$ to $SG_{L4}$ in the harness connecting portion 12 so that the bared core wires thereof are in contact with the fixed contacts $T_{S1}$ to $T_{S5}$ and $T_{L1}$ to $T_{L4}$ at the welding windows $SW_{S1}$ to $SW_{S5}$ and $SW_{L1}$ to $SW_{L4}$; (2) covering the surface side of with the fixed contacts $T_{S1}$ to $T_{S5}$ and $T_{L1}$ to $T_{L4}$ with the cover 13; (3) tacking the core wires of the lead wires and the fixed contacts $T_{S1}$ to $T_{S5}$ and $T_{L1}$ to $T_{L4}$; (4) welding them by means of ultrasonic welding; (5) welding the other ends of the lead wires $L_{S1}$ to $L_{S5}$ and $L_{L1}$ to $L_{L4}$ of the harness 3 with the harness connecting portion 22 of the connector 4 by means of ultrasonic welding; and (6) covering the switch body 2 and the harness connecting portions 12 and 22 of the connector 4 with the sealing members 18 and 28.

Thereafter, by interconnecting the rotatable lever 11 of the switch body 2 with the shift lever 50, the control switch 1 can output the switch signal according to the shift position of the shift lever 50.

With the thus arranged embodiment, since the small-power fixed contacts $T_{S1}$ to $T_{S5}$ and the large-power fixed contacts $T_{L1}$ to $T_{L4}$ are integrally formed with the small-power external connecting terminals $SC_{S1}$ to $SC_{S5}$ and the large-power external connecting terminals $SC_{L1}$ to $SC_{L4}$, the number of the parts constituting the switch body 2 is reduced.

Further, since the small-power external connecting terminals $SC_{S1}$ to $SC_{S5}$ and the large-power external connecting terminals $SC_{L1}$ to $SC_{L4}$ are exposed outside through the welding windows $SW_{S1}$ to $SW_{S5}$ and $SW_{L1}$ to $SW_{L4}$, the connecting terminals $SC_{S1}$ to $SC_{S5}$ and $SC_{L1}$ to $SC_{L4}$ are welded with the lead wires $L_{S1}$ to $T_{S5}$ and $L_{L1}$ to $L_{L4}$ by means of ultrasonic welding. This welding connection improves connecting strength between the connecting terminals $SC_{S1}$ to $SC_{S5}$ and $SC_{L1}$ to $SC_{L4}$ and the with the lead wires $L_{S1}$ to $L_{S5}$ and $L_{L1}$ to $L_{L4}$ and largely decreases the time necessary for assembling them while not requiring the caulking.

In addition, by continuously forming the lead wires $L_{S1}$ to $L_{S5}$ and $L_{L1}$ to $L_{L4}$ and the guide grooves and by tacking the lead wires $L_{S1}$ to $T_{S5}$ and $L_{L1}$ to $L_{L4}$ upon inserting them into these windows $SW_{S1}$ to $SW_{S5}$ and $SW_{L1}$ to $SW_{L4}$ respectively, the welding of the lead wires $L_{S1}$ to $T_{S5}$ and $L_{L1}$ to $L_{L4}$ and the external connecting terminals $SC_{S1}$ to $SC_{S5}$ and $SC_{L1}$ to $SC_{L4}$ becomes easy.

Furthermore, by welding the harness 3 with the switch body 2 and the connector 4 by means of ultrasonic welding, it becomes possible to establish the strong connection without taking long time.

By covering the welded portions of the switch body 2 and the connector 4 with the sealing members 18 and 28, it becomes possible to maintain the firm connecting condition therebetween while ensuring the sealing performance. In addition, if the sealing members 18 and 28 are of transparent resin material, the welding conditions of the welded portions are easily checked.

Since the connector 4 is integrally constituted by the small-power contacts $P_{S1}$ to $P_{S5}$ and the large-power contacts $P_{L1}$ to $P_{L4}$, it becomes possible to reduce the producing cost thereof. In addition, the control switch 1 can be connected with an external device through one connector. This facilitates the connecting operation of the control switch 1.

Next, a method of producing the automatic-transmission control switch 1 of the above-mentioned embodiment will be discussed hereinafter with reference to FIGS. 9A to 11.

Figure 9A:
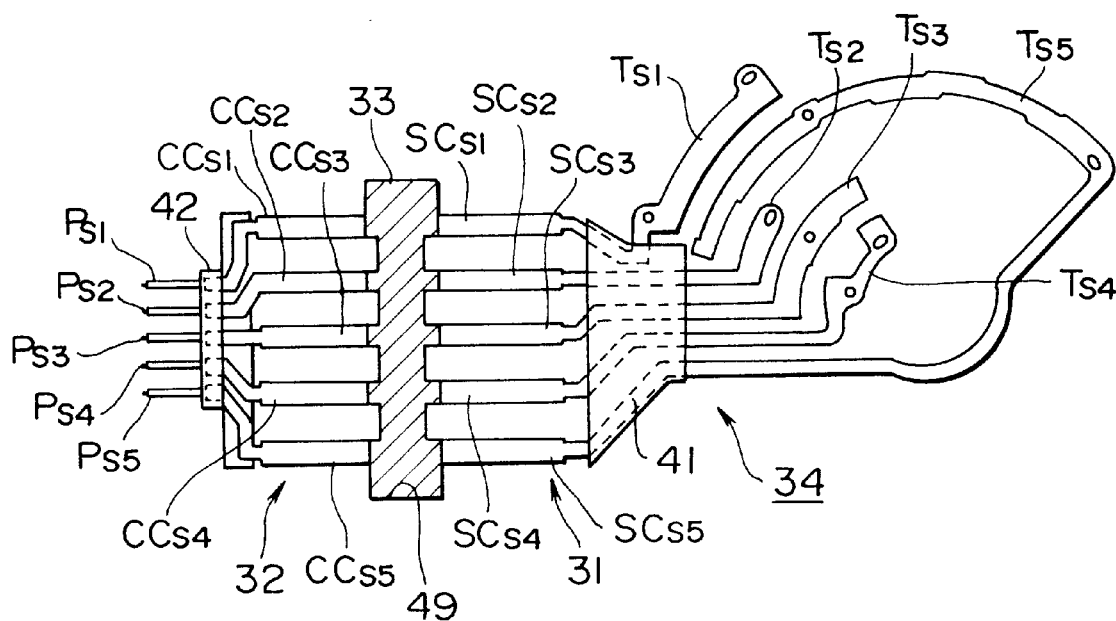
FIG. 9A is a front view of a first terminal unit used in the control switch of FIG. 1.
Figure 9B:
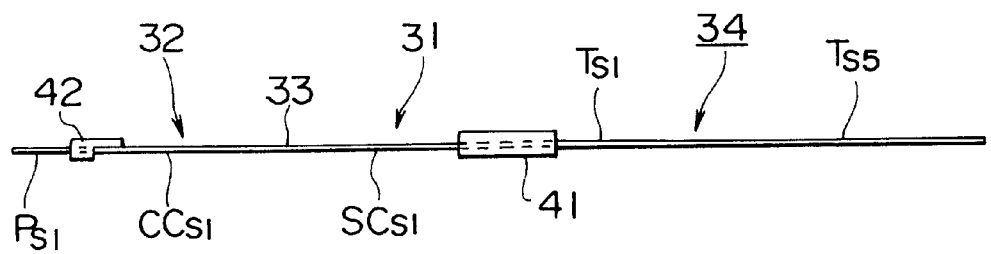
FIG. 9B is a plan view of FIG. 9A.

First, as shown in FIGS. 9A to 9B, the electric conductor 31 constitutes-the small-power fixed contacts $T_{S1}$ to $T_{S5}$ and the small-power external connecting terminals $SC_{S1}$ to $SC_{S5}$ of the switch body 2, and the electric conductor 32 constitutes the small-power connecting terminals $CC_{S1}$ to $CC_{S5}$ and the small-power contacts $P_{S1}$ to $P_{S5}$ of the connector 4. A first terminal unit 34, which is constituted by the electric conductors 31 and 32 connected through the coupling portion 33, is press-formed by hoop-forming.

Similarly, as shown in FIGS. 10A to 10B, the electric conductor 35 constitutes the large-power fixed contacts $T_{L1}$ to $T_{L4}$ and the large-power external connecting terminals $SC_{L1}$ to $SC_{L4}$ of the switch body 2, and the electric conductor 36 constitutes the large-power connecting terminals $CC_{L1}$ to $CC_{L4}$ and the large-power contacts $P_{L1}$ to $P_{L4}$ of the connector 4. A second terminal unit 38, which is constituted by the electric conductors 35 and 36 connected through the interconnecting portion 37, is press-formed by hoop-forming.

The first terminal unit 34 is formed such that the electric conductors 31 and 32 and the interconnecting portion 33 are located on the same plane. In contrast, as shown in FIG. 10B, the second terminal unit 38 is formed such that the bent portion 39 of a crank-shape is formed at the left end side of the projecting portion of the recess portion 6 of the fixed terminals $T_{L1}$ to $T_{L4}$, a bent portion 39b of a crank-shape is formed in the vicinity of the external connecting terminals $SC_{L1}$ to $SC_{L4}$. Therefore, portions between the fixed contacts $T_{L1}$ to $T_{L4}$ and the external connecting terminals $SC_{L1}$ to $SC_{L4}$ are depressed. Further, crank-shaped bent portions 39a and 39d are formed at connecting portions of the coupling portion 37 with the electric conductors 35 and 36. The coupling portion 37 is depressed by the thickness of the coupling portion 33 of the first terminal unit 34. Further, a crank-shaped bent portion 39e is formed at the left end portion of the connecting terminals $CC_{L1}$ to $CC_{L4}$.

A separation groove 49 is formed at the coupling portions 33 and 37 so as to facilitate the separation between the electric conductors 31 and 32 and between the electric conductors 35 and 36.

In the first terminal unit 34, the connecting portions between the fixed contacts $T_{L1}$ to $T_{L4}$ and the external connecting terminals $SC_{L1}$ to $SC_{L4}$ are covered with the positioning resin block 41 made of adhesive, and the connecting portions between the connecting terminals $CC_{L1}$ to $CC_{L4}$ and the contacts $P_{L1}$ to $P_{L4}$ are covered with the positioning resin block 41 made of adhesive.

Similarly, in the second terminal unit 38, the connecting portions between the fixed contacts $T_{S1}$ to $T_{S5}$ and the external connecting terminals $SC_{S1}$ to $SC_{S5}$, which portions correspond to those of the first terminal unit 34, are covered with the positioning resin block 43 made of adhesive, and the connecting portions between the connecting terminals $CC_{S1}$ to $CC_{S5}$ and the contacts $P_{S1}$ to $P_{S5}$, which portions correspond to those of the first terminal unit 34, are covered with the positioning resin block 44 made of adhesive.

These positioning resin blocks 41 to 44 are formed by means of insert molding. The positioning resin blocks 41 and 43 are engaged with each other in a manner that one of the positioning resin blocks 41 and 43 has a projection and the other of the blocks 41 and 43 has a recess. Similarly, the positioning resin blocks 42 and 44 are engaged with each other in a manner that one of the positioning resin blocks 42 and 44 has a projection and the other of the positioning resin blocks 44 and 44 has a recess.

Next, as shown in FIG. 11, the second terminal unit 38 is laminated under the first terminal unit 34 by engaging the positioning resin blocks 41 and 42 with the positioning resin blocks 43 and 44 in order to form a laminated body 45.

Since the first terminal unit 34 is flat as shown in FIG. 9B and the second terminal unit 38 is formed to have the bent portions 39a to 39e as shown in FIG. 10B, the joining portions 33 and 37 are laminated though not shown, the fixed contacts $T_{L1}$ to $T_{L4}$ and $T_{S1}$ to $T_{S5}$ the external connecting terminals $SC_{L1}$ to $SC_{L4}$ and $SC_{S1}$ to $SC_{S5}$, the connecting terminals $CC_{L1}$ to $CC_{L4}$ and $CC_{S1}$ to $CC_{S5}$, and the contacts $P_{S1}$ to $P_{S5}$ are located on the same plane. The contacts $P_{L1}$ to $P_{L4}$ are separated from the contacts $P_{S1}$ to $P_{S5}$ by a predetermined distance.

Next, the laminated body 45 is set in a die of an injection molding machine, and then injection molding is executed by using synthetic resin such as engineering plastic. By this molding, the case member 7 of the switch body 2 shown in FIGS. 2 to 4 and the connector 4 shown in FIGS. 5 to 8 are simultaneously formed. Then, the case body 7 and the connector 4 are separated by cutting the separating groove 41 of the coupling portions 33 and 37 of the first and second terminal units 34 and 38, and the remained coupling portion 33 and 37 are removed so that the external connecting terminals $SC_{L1}$ to $SC_{L4}$ and $SC_{S1}$ to $SC_{S5}$ and the connecting terminals $CC_{L1}$ to $CC_{L4}$ and $CC_{S1}$ to $CC_{S5}$ are electrically insulated, respectively.

As mentioned above, the lead wires $L_{L1}$ to $L_{L4}$ and $L_{S1}$ to $L_{S5}$ of the harness 3 are inserted into the lead-wire guiding grooves $SG_{L1}$ to $SG_{L4}$ and $SG_{S1}$ to $SG_{S5}$, and they are tacked by the tacking cover 13. Thereafter, the core wires of the lead wires $L_{L1}$ to $L_{L4}$ and $L_{S1}$ to $L_{S5}$ are welded with the external connecting terminals $SC_{L1}$ to $SC_{L4}$ and $SC_{S1}$ to $SC_{S5}$, respectively, by means of the ultrasonic welding. Next, the other ends of the lead wires $L_{L1}$ to $L_{L4}$ and $L_{S1}$ to $L_{S5}$ are similarly welded with the connecting terminals $CC_{L1}$ to $CC_{L4}$ and $CC_{S1}$ to $CC_{S5}$, respectively, by means of the ultrasonic welding.

Then, the harness connecting portions 12 and 33 of the case body 2 and the connector 4 are covered with the sealing members 18 and 28 by executing insert molding. By executing these processes, the automatic-transmission control switch 1 is produced.

With this producing method, the case body 7 of the switch body 2 and the connector 4 are simultaneously formed. Therefore, the producing cost thereof is largely reduced and the assembling processes are also largely decreased.

Since the first terminal unit 34 and the second terminal unit 38 are connected with each other through the coupling portions 33 and 37, the small-power fixed contacts, the large-power fixed contacts and the external connecting terminals of the case body 7 are firmly connected with the connecting terminals and the contacts of the connector 4 so as to firmly prevent the separation thereof. Further, this enables the first and second terminal units 34 and 38 to be press-formed by hoop-forming.

In addition, since the positioning resin blocks 41 and 42 and the positioning resin blocks 43 and 44 are formed to the first and second terminal units 34 and 38, respectively, the small-power fixed contacts, the large-power fixed contacts and the external connecting terminals of the case body 7 are firmly connected with the connecting terminals and the contacts of the connector 4 so as to firmly prevent the separation thereof. Further, the positioning between the first and second terminal units 34 and 38 firmly executed, and therefore the electrical insulation between the adjacent connecting terminals is securely ensured.

Although the embodiment of the present invention has been shown and described such that the first and second terminal units 34 and 38 have the positioning resin blocks 41 to 44, respectively, it will be understood that the present invention is not limited to this embodiment, and may be arranged such that the positioning resin block is formed one of the first and second terminal units 34 and 38.

Further, while the embodiment of the present invention has been shown and described such that the lead wires $L_{L1}$ to $L_{L4}$ and $L_{S1}$ to $L_{S5}$ of the harness 3 are welded with the external terminals of the case body 7 and the connecting terminals of the connected by means of the ultrasonic welding, it will be understood that the present invention is not limited to this and may apply argon-welding, brazing or soldering instead of ultrasonic welding.

Further, it will be understood that the pattern of the fixed contacts of the switch body 2 may not be limited to the embodiment mentioned in the specification and may be properly modified according to the applied shift lever.

The entire disclosure of Japanese Patent Application No. 8-152404 filed on Jun. 13, 1996 including specification, claims, drawings and summary are incorporated herein by reference in its entirety.

What is claimed is:

1. An automatic-transmission control switch that outputs a switch signal indicative of a shift position of an automatic transmission in relation to a position of a shift lever, said automatic-transmission control switch comprising:

a switch case body;

a plurality of small-power fixed contacts anchored in the switch case body, the small-power fixed contacts being respectively disposed at positions corresponding to shift positions taken by the shift lever;

a plurality of large-power fixed contacts anchored in the switch case body, the large-power fixed contacts being respectively disposed at positions corresponding to shift positions taken by the shift lever;

a movable member swingably mounted on the switch case body;

a plurality of movable contacts fixed on the movable member, the movable contacts selectively establishing an electrical connection with said small-power fixed contacts and said large-power fixed contacts according to the shift position;

a plurality of small-power external connecting terminals integrally formed seamless with and extending away from said small-power fixed contacts, respectively; and a plurality of large-power external connecting terminals integrally formed seamless with and extending away from said large-power fixed contacts, respectively.

2. An automatic-transmission control switch as claimed in claim 1, further comprising:

a harness having a plurality of electrically conductive wires, wherein the small-power external connecting terminals and the large-power external connecting terminals are aligned at a peripheral portion of the case body, the harness electrically conductive wires being electrically connected respectively to the small-power and large-power external connecting terminals by ultrasonic welding; and a connector including:
  connector case body;
  a plurality of small-power connecting terminals anchored in the connector case body;
  a plurality of large-power connecting terminals anchored in the connector case body, wherein the harness electrically conductive wires are electrically connected with the small-power and large-power connecting terminals, respectively, by ultrasonic welding; and
  a plurality of electrical contacts integrally formed seamless with and extending away from the small-power terminals and the large-power terminals, respectively.

3. An automatic-transmission control switch as claimed in claim 1, wherein each of the large-power and small-power external connecting terminals has an exposed portion.

4. An automatic-transmission control switch as claimed in claim 2, wherein the small-power fixed contacts and the small-power external connecting terminals are laminated with the large-power fixed contacts and the large-power external connecting terminals through the switch case body while keeping electric insulation therebetween, and the small-power connecting terminals and the small-power contacts of said connector are laminated with the large-power connecting terminals and the large-power contacts of said connector through the connector case body while keeping electric insulation therebetween.

5. An automatic-transmission control switch as claimed in claim 4, wherein the switch case body and the connector case body are simultaneously molded by injection molding upon inserting the large-power and small-power fixed contacts, the large-power and small-power external connecting terminals, the large-power and small-power connecting terminals and the large-power and small-power contacts in a molding die.

6. A method of producing an automatic-transmission control switch that outputs a switch signal indicative of a shift position of an automatic transmission in relation to a shift lever, the method comprising:

forming a first terminal unit having a plurality of small-power fixed contacts, a plurality of small-power external connecting terminals integrally formed seamless with and extending away from the small-power fixed contacts respectively, and a first connector portion having a plurality of small-power contacts integrally formed seamless with and extending away from the small-power external connecting terminals through a first coupling portion;

forming a second terminal unit having a plurality of large-power fixed contacts, a plurality of large-power external connecting terminals integrally formed seamless with and extending away from the large-power fixed contacts respectively, and a second connector portion having a plurality of large-power contacts integrally formed seamless with and extending away from the large-power contacts through a second coupling portion;

forming a positioning resin block to at least one of the first and second terminal units;

laminating the first and second terminal units through the positioning block in a molding die;

molding a switch body and a connector upon laminating the first and second terminal units; and separating the switch body and the connector by cutting the first and second coupling portion, wherein the switch body includes the small-power and large-power fixed contacts and the small-power and large-power external connecting terminals, and the connector includes the first and second connector portions.

7. A method as claimed in claim 6, wherein the positioning block is formed at each of the first and second terminal units.

8. A method as claimed in claim 6, further comprising:

providing a wiring harness having a plurality of electrical conductors;

welding the larger-power and small-power external connecting terminals of the switch body respectively to one end of the electrical conductors, and welding the larger-power and small-power external terminals of the connector respectively to another end of the electrical conductors; and covering the welded portions between the switch body and the wiring harness and between the connector and the harness with a sealant.

9. A method as claimed in claim 8, wherein the welding is an ultrasonic welding.

10. An automatic-transmission control switch that outputs a switch signal indicative of a shift position of an automatic transmission in relation to a position of a shift lever, said automatic-transmission control switch comprising:

a switch case body;

a small-power terminal unit anchored in the switch case body, the small-power terminal unit having a plurality of small-power fixed contacts and a plurality small-power external connecting terminals respectively integrally formed seamless with and extending away from the small-power fixed contacts, the small-power fixed contacts being respectively disposed at positions corresponding to shift positions taken by the shift lever, the small-power external connecting terminals being aligned at a peripheral portion of the switch case body;

a large-power terminal unit anchored in the switch case body, the large-power terminal unit having a plurality of large-power external connecting terminals respectively integrally formed seamless with and extending away from the large-power fixed contacts, the large-power fixed contacts being respectively disposed at positions corresponding to shift positions taken by the shift lever, the larger-power terminal unit being laminated with the small-power terminal unit while keeping electrical insulation therebetween, the large-power external connecting terminals being aligned at the peripheral portion of the switch case body;

a movable member swingably mounted on the switch case body;

a plurality of movable contacts fixed on the movable member, the movable contacts selectively establishing an electric connection with said small-power fixed contacts and said large-power fixed contacts according to the shift position;

a connector including:

a connector case body;

an auxiliary small-power terminal unit anchored in the connector case body, the auxiliary small-power terminal unit having a plurality of small-power connecting terminals and a plurality of small-power contacts integrally formed seamless with and extending away from the small-power terminals respectively, an auxiliary large-power terminal unit anchored in the connector case body, the auxiliary large-power terminal unit having a plurality of large-power connecting terminals and a plurality of large-power contacts integrally formed with and extending away from the large-power terminals respectively, the large-power connecting terminals being aligned at an end portion of the connector case body, the large-power contacts being aligned at an opposite end portion of the end portion of the connector base body, the auxiliary large-power terminal unit being laminated with the auxiliary small-power terminal unit while keeping electrical insulation therebetween; and a harness through which the small-power and large-power external connecting terminals are electrically connected respectively with the small-power and large-power contacts by ultrasonic welding, wherein the harness comprises a plurality of electrical conductors, one end of the electrical conductors being ultrasonically welded respectively to the larger-power and small-power external connecting terminals, and another end of the electrical conductors being ultrasonically welded to the larger-power and small-power connecting terminals.

11. An automatic-transmission control switch as claimed in claim 10, wherein the small-power terminal unit and the auxiliary small-power unit are formed from one terminal unit which is press-formed by hoop-forming, and the large-power terminal unit and the auxiliary large-power unit are formed from one terminal unit which is press-formed by hoop-forming.

* * * * *